Patented Sept. 5, 1950

2,521,575

UNITED STATES PATENT OFFICE 2,521,575

COPOLYMERS OF MALEIC ALKYDS WITH MONO-VINYL COMPOUNDS

Charles F. Fisk, Clifton, N. J., assignor to United States Rubber Company, New York, N. Y., a corporation of New Jersey No Drawing. Application July 10, 1947,
Serial No. 760,101

4 Claims. (Cl. 260—45.4)

This invention relates to improvements in copolymer resins.

An object of the invention is to provide copolymer resins which possess increased optical brilliance. A further object is to provide such resins which, when subjected to heat aging, will be substantially free of discoloration. Other objects will be apparent from the hereinafter detailed description.

My invention consists in producing a liquid casting resin composition in which the essential polymerizable ingredients are a monomeric ethylenic compound having a terminal $CH_2=CH-$ group, and a partially polymerized alkyd-type condensation polymer of 2-ethylhexanediol-1,3 with maleic acid or the anhydride thereof. Such a liquid casting resin composition can be polymerized to a clear, colorless resin by using heat or actinic light and a non-acidic catalyst which is capable of polymerizing the monomeric ethylenic compound per se.

Exemplary of such monomeric ethylenic compounds are styrene and methyl methacrylate.

The following procedure illustrates a preferred manner of preparing the polyester (the parts are by weight):

EXAMPLE 1

A mixture of 3.15 gram-molecular-weights of 2-ethylhexanediol-1,3 and 3.0 gram-molecular-weights of maleic anhydride is heated for 2.5 hours at 175° C. while a stream of inert gas (carbon dioxide or nitrogen) is bubbled through the mixture. The polyester thus obtained is a highly viscous liquid at room temperature, and has an acid value of 38; at 100° C., it is a liquid having a viscosity of 37 poises. The product is soluble both in styrene and in methyl methacrylate, yielding clear, colorless solutions.

The mole ratio of reactants may range, in accordance with recognized practice, from about 0.9 to about 1.1 moles of the glycol per mole of maleic anhydride. The acid number of the product may be varied, as is well-known, by varying the time and temperature of heating.

The invention is particularly concerned with those polymerizable systems employing styrene as a monomer for copolymerization with the above described liquid polyester of 2-ethylhexanediol-1,3 with maleic acid. The copolymerization can be carried out, when desired, in the presence of any polymerization catalyst for styrene itself.

A preferred liquid casting resin within this class is a solution of 70 parts by weight of 2-ethylhexanediol-1,3 maleate alkyd in 30 parts by weight of monomeric styrene. The liquid resin composition, when polymerized by the usual techniques, forms a clear, water-white, rigid resin.

EXAMPLE 2

Seventy parts of the polyester of Example 1 are blended with 30 parts of styrene containing 0.01 part of inhibitor (para-tert.-butyl catechol) and 1.0 part of benzoyl peroxide. It is convenient to blend half of the styrene with the alkyd and to dissolve the peroxide in the other half of the styrene and to add this solution to the alkyd blend just before casting is to be carried out. The blended combined solution has a viscosity of 5 poises. It is promptly cast in a suitable mold, e. g., a chrome-plated cell, and the closed mold is heated for 1.5 hours at 70° C. and then at 110° C. for 1 hour.

The physical properties of the cured casting thus obtained are:

| | |
|---|---|
| Rockwell hardness | M–83 |
| Barcol hardness | 24 |
| Young's modulus (bending) p. s. i. | 320,000 |
| Temperature at which modulus is 100,000 p. s. i. | 98° C. |
| Impact strength (unnotched) | 1.0 ft.-lb. (½ inch width; 1 inch thickness) |
| Tensile strength p. s. i. | 5000 |
| Specific gravity | 1.13 |

The casting also has excellent clarity, transparency, and color stability, as shown by the following data on the extinction co-efficient for violet light before aging and after various periods of aging in air at 100° C. (increasing absorption of violet light parallels increasing yellowish color noted visually):

*Extinction Coefficient for Violet Light*

| Days of aging at 100° C. | 0 | 1 | 4 | 7 |
|---|---|---|---|---|
| Coefficient: | | | | |
| Resin of my invention | 0.084 | 0.143 | 0.189 | 0.189 |
| Ordinary resin from styrene and diethylene glycol maleic alkyd | 0.483 | 0.635 | 0.830 | 0.883 |

The data indicate the comparative freedom from yellowness and the great color stability of my resin in comparison with the considerable initial yellowness and increased yellowness on aging of an ordinary resin of similar type made from diethylene glycol.

The relative amounts of the alkyd and the ethylenic monomer used in preparing my casting resins may be varied from a ratio of 1:99 to a ratio of 95:5, in which range the advantages of freedom from color and resistance to yellowing on aging are realized. The cured products obtained vary considerably in properties over this wide range of compositions and are particularly adapted to different uses, depending on the alkyd content. When the alkyd content is 1 to 20%, the physical properties of the hard copolymer resin resemble those of the corresponding homopolymeric ethylenic compound, for example, polystyrene, with the exception that the alkyd crosslinks the styrene and thereby results in a copolymer resin which, unlike polystyrene, exhibits no thermoplastic flow at 100° C. and above. The dielectric power loss is low, though greater than that of polystyrene. The viscosity of the liquid copolymerizable mixture is low, approximately that of the ethylenic monomer, and consequently the composition shows excellent penetration and absorption properties, as in making laminates.

When the alkyd content of the copolymer is in the range 20 to 80%, the rigid copolymer resulting shows some increase in toughness as the alkyd content increases. The resistance to softening by heat also increases, as does the resistance to swelling in hydrocarbons. The products of this range are of the most general utility.

As the alkyd content is increased from 80% up to 95% the cured products become softer so that at 95% flexibility is obtained. Copolymers of such composition may be used in emulsion, as, for example, textile finishing or coating materials.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A liquid polymerizable mix comprising styrene and a liquid condensation polymer of 2-ethylhexanediol-1,3 with a maleic compound selected from the class consisting of maleic acid and maleic acid anhydride, the ratio by weight of styrene to the polymer being, respectively, from 1:99 to 95:5.

2. A hard rigid polymerization product of a polymerizable mix as set forth in claim 1.

3. A copolymer, the monomeric constituents of which consist of from 5 to 99% of an ethylenic compound selected from the class consisting of styrene and methyl methacrylate, and correspondingly from 95 to 1% of a liquid condensation polymer of 2-ethylhexanediol-1,3 with a maleic compound selected from the class consisting of maleic acid and maleic acid anhydride.

4. A resinous product of good clarity, transparency, and color stability which is the product of polymerization of a mix of about 30 parts of monomeric styrene with about 70 parts of 2-ethylhexanediol-1,3 maleate alkyd.

CHARLES F. FISK.

REFERENCES CITED

The following references are of record in the file of this patent:

UNITED STATES PATENTS

| Number | Name | Date |
|---|---|---|
| 2,305,224 | Patterson | Dec. 15, 1942 |
| 2,460,186 | Moffett | Jan. 25, 1949 |

Certificate of Correction

Patent No. 2,521,575 — September 5, 1950

CHARLES F. FISK

It is hereby certified that error appears in the printed specification of the above numbered patent requiring correction as follows:

Column 2, line 28, strike out "98° C."; line 29, strike out "1.0 ft.-lb. (½ inch" and insert instead *98° C.*; line 30, after "(unnotched)" insert *1.0 ft.-lb. (for ½ inch*; and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*